May 18, 1937. P. MODIGLIANI 2,081,060
PROCESS FOR THE MECHANICAL PRODUCTION OF GLASS FELT
Filed March 7, 1936 2 Sheets-Sheet 2
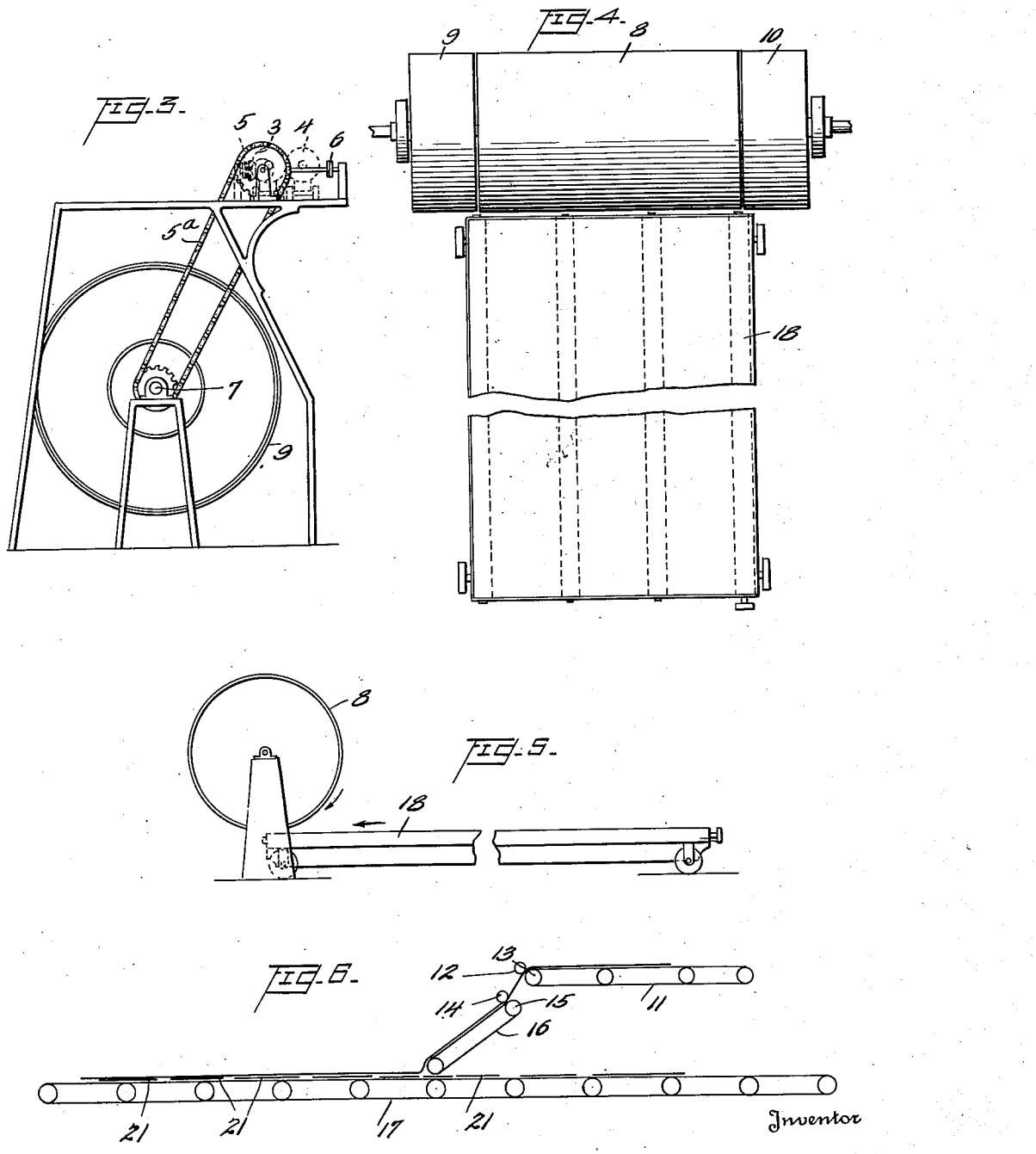

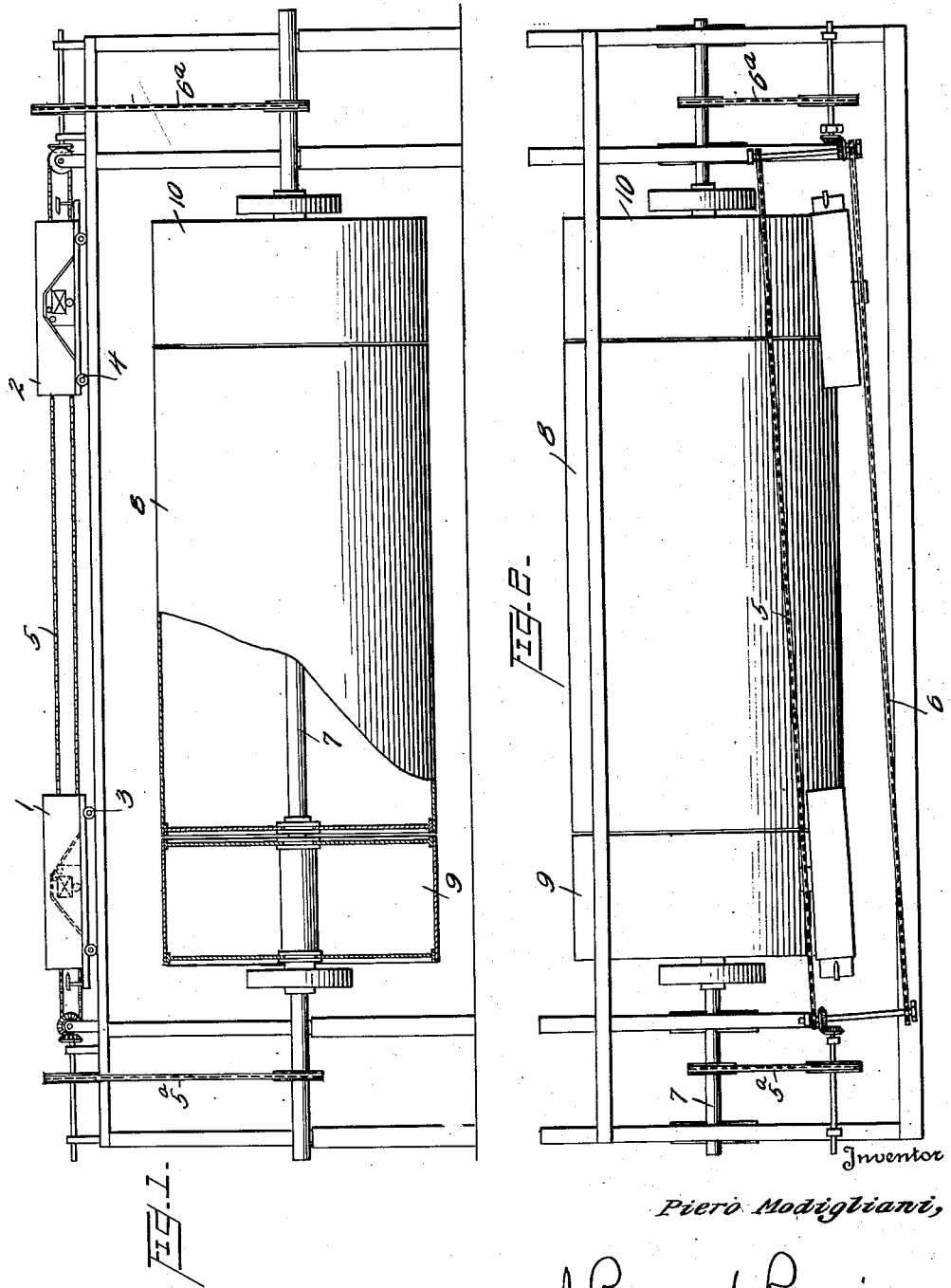

Patented May 18, 1937

2,081,060

UNITED STATES PATENT OFFICE 2,081,060

PROCESS FOR THE MECHANICAL PRODUCTION OF GLASS FELT

Piero Modigliani, Livorno, Italy

Application March 7, 1936, Serial No. 67,653
In Italy November 18, 1935

6 Claims. (Cl. 154—27)

The present invention relates generally to a process and apparatus for the production of relatively thin layers of spun glass or glass fibers and is more particularly directed to the production of such layers of spun glass or glass fibers which are employed for diffusing and diverting or redirecting light rays. More specifically the present invention relates to the production of a laminated glazing glass of the type shown in applicant's Patent No. 2,011,252, and to the production of glass fiber laminae for use in such laminated glass.

The product of the present invention consists of a layer of spun glass fibers or threads, the layer consisting of a plurality of strata of such spun glass, the fibers in each stratum being disposed at an angle to the fibers in the adjacent stratum. The optical properties of this product are determined in part by the thickness of the layer, the angles at which the fibers or threads cross each other and the distribution of the crossing points.

In the present method two glass spinning devices each cooperate with a rotating drum operated in such manner as to deposit on a rotatable drum superposed helices of glass fiber or thread, the fibers or threads deposited by one of these devices being disposed at an angle with relation to the threads of the helices formed by the other device. This process may be repeated any desired number of times with the result that the cylinder is covered with successive strata of glass fibers or threads, the fibers in each stratum being disposed at an angle to the fibers in the adjacent strata. The layer of glass fiber formed on the drum is removed therefrom by cutting the same longitudinally of the drum and depositing it in flattened condition on a conveyor. The layer is now subjected to a stretching and thinning operation so that the layer is reduced to the desired thickness, and at the same time the angles between the crossing fibers become fixed. This operation is conducted with particular reference to the specific use of the material. The degree of thinning and stretching determines the crossing angle of the threads, the distribution and size of the hollow spaces and thereby the light diverting power and heat insulating quality of the product are determined.

For a more detailed understanding of the process and of the apparatus reference is now had to the accompanying drawings in which Fig. 1 is a partly sectional elevation of the spinning apparatus.

Fig. 2 is a plan view thereof; and

Fig. 3 is an end view thereof.

Fig. 4 illustrates the transfer of the layer of spun glass from the drum to the transfer table; and Fig. 5 is an end view of the apparatus shown in Fig. 4.

Fig. 6 is a side elevation of the stretching and thinning apparatus.

In the drawings reference characters 1 and 2 designate two glass thread forming or spinning devices. These it will be seen are mounted on wheeled traveling frames 3 and 4 respectively and are disposed over the winding drum 8. Each of the spinning devices is moved backwards and forwards and over the entire length of the winding drum 8 by means of chains 5 and 6 respectively, power being transmitted to the chains 5 and 6 by endless chains 5a and 6a from the drive shaft 7 of the drum.

As the drum 8 rotates and as each of the spinning devices 1 and 2 travels longitudinally over the drum, a helical thread of glass is deposited on the drum by each of these devices, these helices however crossing each other at an angle determined by the relative speeds of the spinning devices and the drum.

The shaft 7 of the drum 8 also carries two small drums 9 and 10, one adjacent each end of the drum 8. The rotation of the drum 8 can be stopped while at the same time the rotation of the drums 9 and 10 may be maintained by means of their individual driving disks. This entire apparatus is built on a framework as shown in the drawings.

The operation of this machine is as follows: As the drum 8 rotates the two thread forming devices 1 and 2 each produces from its spinning nozzle a glass thread which is wound on the drum 8 in the form of a helix. The travelling frames 3 and 4 together with these thread forming devices are moved backwards and forwards in opposite directions with the result that compact strata of regularly and closely spaced threads are formed in each helix, the stratum formed by one helix, however, crossing the threads of the other helix at an angle thereto. The two strata may be made of glass of different color if desired. The angle at which the two strata cross each other and the spacing of the crossing points depends upon the speed of the drum 8 and of the thread forming devices 1 and 2.

When the cylindrical layer of threads has reached a desired thickness or a desired number of strata this layer is removed from the drum 8. For this purpose the layer is cut longitudinally of the drum. This cutting operation is performed after the rotation of the drum 8 has been stopped while drums 9 and 10 are maintained in rotation, the thread forming devices 1 and 2 being maintained in the position shown in Figure 1, namely, over the drums 9 and 10 respectively. The layer of glass threads is now transferred from the drum 8 onto the transfer table 18 in the manner shown in Figures 4 and 5. The transfer table is placed as shown in Figures 4 and 5 with its forward end disposed adjacent one cut end of the layer of glass threads and as the drum is slowly rotated the table is moved as shown by the arrows in Figure 5 so that the layer is transferred from the drum 8 onto the transfer table 18 in flat condition.

While this operation is being performed glass threads are being wound on the drums 9 and 10 and this glass thread may be used for other purposes.

The flat layer of glass threads has several strata, the threads in each stratum being disposed at an angle to the threads in adjacent strata. The layer is rather compact, the threads being rather closely spaced. Before this layer is employed in the manufacture of laminated glazing glass shown in Patent No. 2,011,252, it is preferred to stretch the layer so that its thickness is reduced and the entire body becomes highly porous having a large proportion of voids therein and so that the number of crossing points between individual threads is more or less rarified or more thoroughly distributed over the area of the layer. For this purpose the layer is transferred from the table 18 to the endless conveyor belt 11 in such a manner that the threads are disposed in a direction transverse to the direction of travel of the conveyor 11. The conveyor 11 has its forward end disposed near the rear end of an inclined endless conveyor 16, the latter having its lower end disposed over an endless conveyor 17. The conveyor 17 carries a series of glass plates 21.

The relatively compact layer of glass threads on the conveyor 11 is carried off by the rollers 12 and 13 and deposited on to the conveyor 16 and the cooperative rollers 14 and 15 serve to convey the same over the conveyor 16 and onto the conveyor 17 and the glass plates 21. The rate of travel of the conveyor 11 and of the cooperating rollers 12 and 13 is lower than the speed of the pair of cooperating rollers 14 and 15 and of the conveyor 16. The layer is therefore thinned and stretched as it passes from conveyor 11 to conveyor 16, and is deposited over the glass plates 21. The layer may now be cut to correspond with the size and shape of the glass plates 21 and each of the glass plates and layers of glass threads may now be covered with a second glass plate and the same may be subsequently treated in a suitable manner to complete the product shown in Patent No. 2,011,252.

I claim:—

1. The method of producing superposed layers of glass threads which comprises continuously forming two glass threads, and helically winding the threads onto a rotary member, the winding operation of the two threads being conducted in opposite directions whereby the successive layers of threads bear an angular relationship to each other.

2. The method of producing a multi-strata thin layer of glass threads, which comprises continuously forming a glass thread, helically winding said thread onto a rotary member, simultaneously forming a second glass thread, and helically winding said second thread in a direction opposite to the direction of winding of the first thread whereby the successive layers of threads bear an angular relationship to each other.

3. The method of producing a translucent body of glass threads, which comprises forming a multistrata layer of glass threads, the threads in each stratum being disposed angularly relative to the threads in adjacent strata and stretching said layer to simultaneously produce a body of predetermined thickness and a predetermined angularity between the crossing threads within the body.

4. An apparatus of the class described comprising a rotary drum, a pair of glass thread forming devices cooperating with said drum, and means for reciprocating said devices longitudinally of the drum and in opposite directions relative each other.

5. An apparatus for the production of diffusing and light directing bodies comprising a pair of glass thread forming devices, a main rotary drum cooperating with said devices to wind said glass threads on the surface of the drum, a shaft for rotating said drum, means for reciprocating said devices longitudinally of the drum and in opposing directions whereby said threads are helically wound on said drum, and an auxiliary drum carried by said shaft at each end of said main drum and driven by said shaft, said auxiliary drums being designed to receive the glass threads from said thread forming devices when rotation of said main drum is stopped.

6. In combination, a rotary drum, a pair of glass thread forming devices disposed over said drum, means for reciprocating said devices in opposite directions for the formation on said drum of a multistratum layer of glass threads, in combination with a traveling conveyor, means for transferring said layer from said drum to said traveling conveyor, and a second traveling conveyor disposed ahead of and adjacent to the first conveyor and operating at a greater speed than the first conveyor.

PIERO MODIGLIANI.